April 5, 1966    H. W. DIETERT ET AL    3,243,856
METHOD AND APPARATUS FOR ADDING POWDERED MATERIAL
TO GRANULAR MATERIAL
Filed July 15, 1963    3 Sheets-Sheet 1

INVENTORS
HARRY W. DIETERT
RANDOLPH L. DIETERT
BY
ATTORNEYS

April 5, 1966 H. W. DIETERT ET AL 3,243,856
METHOD AND APPARATUS FOR ADDING POWDERED MATERIAL
TO GRANULAR MATERIAL
Filed July 15, 1963 3 Sheets-Sheet 2
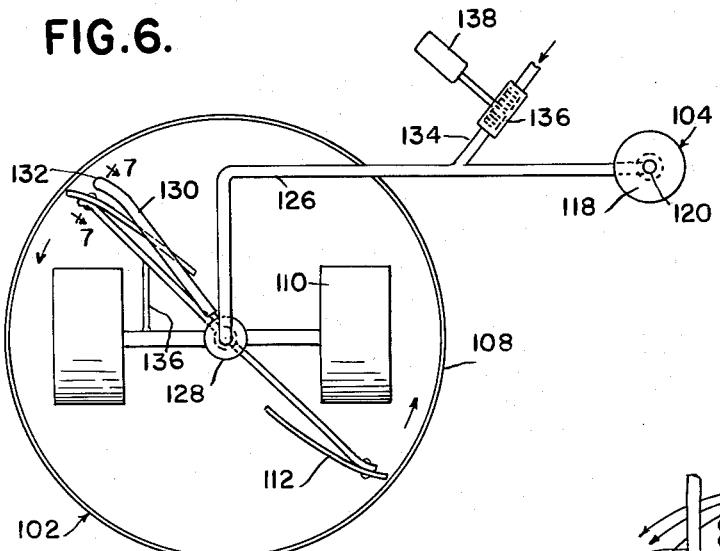
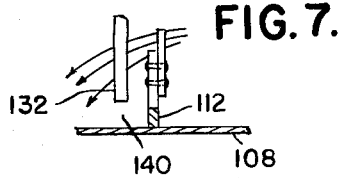
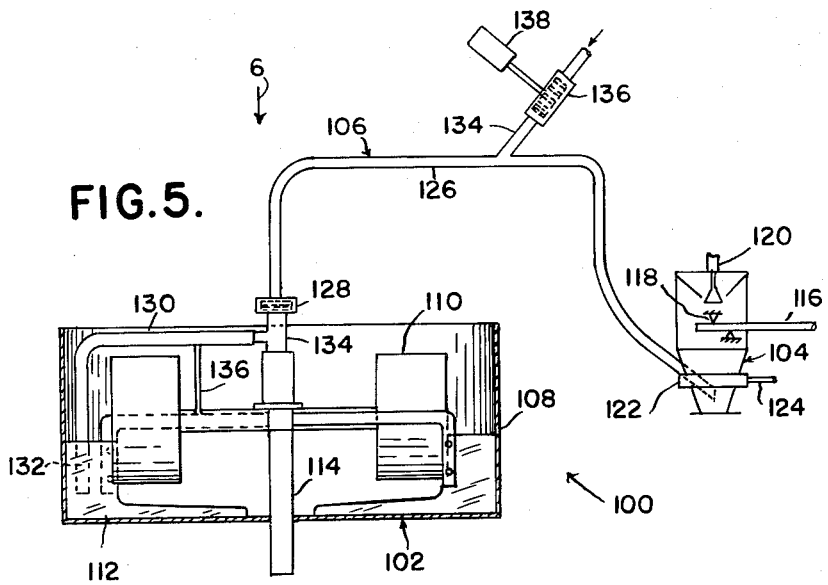
INVENTORS
HARRY W. DIETERT
BY RANDOLPH L. DIETERT
ATTORNEYS

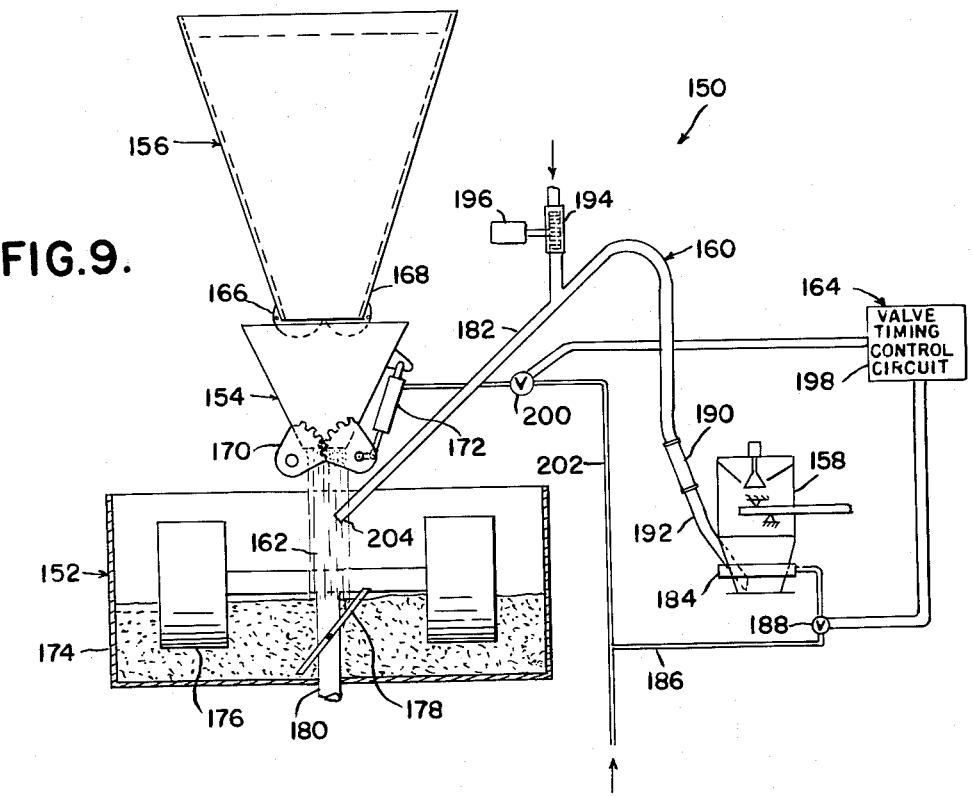

United States Patent Office 3,243,856
Patented Apr. 5, 1966

3,243,856
METHOD AND APPARATUS FOR ADDING POWDERED MATERIAL TO GRANULAR MATERIAL
Harry W. Dietert, Kerrville, Tex., and Randolph L. Dietert, Detroit, Mich., assignors to Harry W. Dietert Co., Detroit, Mich., a corporation of Michigan
Filed July 15, 1963, Ser. No. 294,899
3 Claims. (Cl. 22—89)

The invention relates to granular material conditioning and refers more specifically to a method of and apparatus for adding powdered material to granular material with a minimum amount of dust.

In conditioning granular material such as, for example, foundry sand, it is often necessary to add powdered material such as a bonding agent to the granular material. In the past, the addition of powdered bonding agent to foundry sand has resulted in producing considerable dust which is undesirable and in that it makes breathing difficult in the conditioning area and produces a generally unsightly appearance. Further, the powdered material suspended in the air as dust may stick to mechanical operating parts of conditioning apparatus and cause error or failure thereof.

It is therefore one of the objects of the present invention to provide an improved method of and means for adding powdered material to granular material.

Another object is to provide a method of adding powdered material to granular material which substantially eliminates dust during the addition.

Another object is to provide apparatus for adding powdered material to granular material with a minimum amount of dust.

Another object is to provide a method of adding powdered material to granular material comprising letting the granular material fall in a stream and introducing the powdered material into the granular material within the stream.

Another object is to provide a method for introducing powdered material into granular material as the granular material is being mulled in a mixer without producing dust comprising mulling the granular material in the mixer by means of a rotatable scraper and introducing the powdered material into the granular material below the depth of the granular material and immediately behind the rotating scraper.

Another object is to provide apparatus for introducing powdered material into granular material comprising a mixer, means for gravity feeding granular material into the mixer, a bin for storing granular material and means for introducing powdered material into the granular material as it is fed into the mixer.

Another object is to provide apparatus for introducing powdered material into granular material comprising a weighing hopper for the powdered material, a mixer for mulling the granular material having a rotating scraper therein below the surface of the granular material, means for transferring the powdered material from the hopper into the mixture below the level of the granular material in the mixer and immediately behind the rotating scraper.

Another object is to provide apparatus as set forth above wherein the means for transferring the powdered material into the granular material comprises a conduit and further including means for providing a positive pressure in said conduit to prevent caking of the powdered material in the conduit.

Another object is to provide a method of and apparatus for adding powdered material to granular which are simple, economical, and efficient.

Other objects and features of the invention will become apparent as the description proceeds, especially when taken in conjunction with the accompanying drawings illustrating a preferred embodiment of the invention, wherein:

FIGURE 5 is a partially broken away elevation view of a modification of the apparatus for adding powdered material to granular material in accordance with the method of the invention.

FIGURE 6 is a top view of the modified apparatus illustrated in FIGURE 5 taken in the direction of arrow 6 in FIGURE 5.

FIGURE 7 is an enlarged partial section of the apparatus illustrated in FIGURE 5 taken substantially on the line 7—7 in FIGURE 6.

FIGURE 9 is a partially broken away elevation view of another modification of the apparatus for adding powdered material to granular material in accordance with the method of the invention.

With particular reference to the drawings, one embodiment of the present invention will now be considered in detail.

Figure 1:
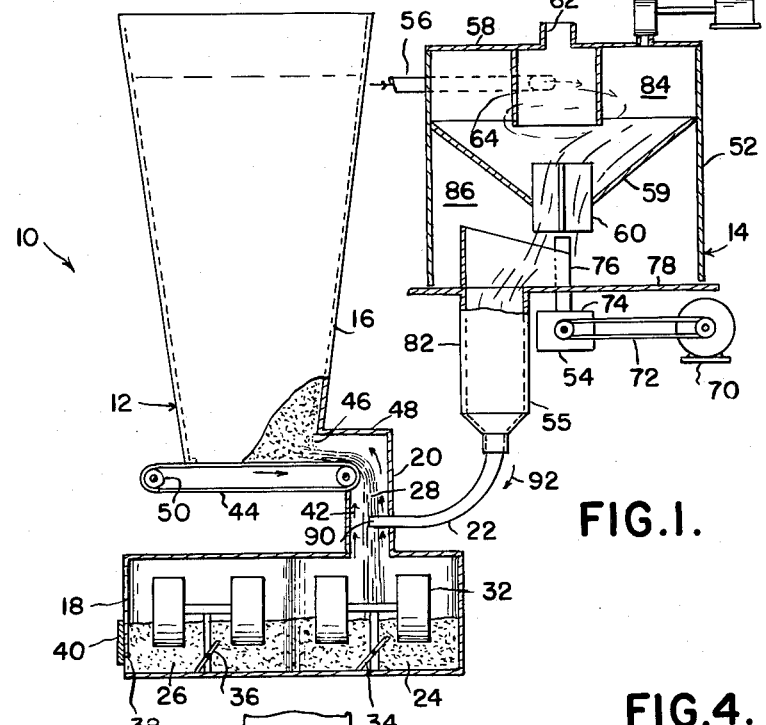
FIGURE 1 is a diagrammatic elevation view partly broken away showing apparatus for adding powdered material to granular material in accordance with the method of the invention.

The apparatus 10 illustrated in FIGURE 1 for adding powdered material 30 to granular material 28 comprises a structure 12 for storing and mulling granular material and a structure 14 for feeding powdered material into the structure 12. The granular material is fed from the bin 16 into the mixer 18 through a chute 20. In accordance with the invention the powdered material is fed through a conduit 22 into the granular material in the chute 20 so that the powdered material is mixed with the granular material without producing objectionable dust.

More specifically, the mixer 18 is a continuous mixer of the well known type having the structure of two batch type mixers in series. With such structure, granular material 28 and the powdered material 30 mixed in chute 20 is first mulled by rotors 32 in portion 24 of the mixer 18 after which it is transferred to portion 26 of the mixer 18 by means of the cooperating scrapers 34 and 36 respectively. The thoroughly mixed granular material and additive is removed through opening 38 in the portion 26 of the mixer 18 which is regulated by means of the door 40.

Figure 3:
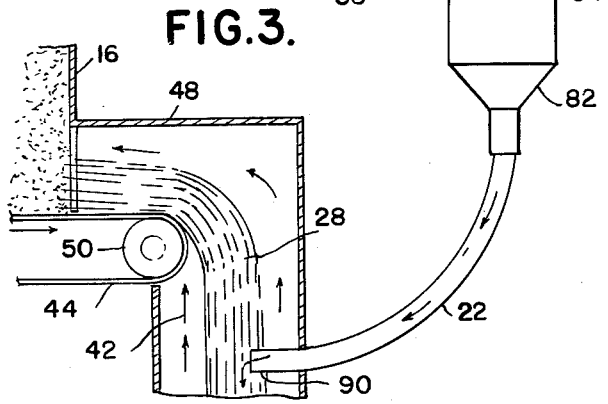
FIGURE 3 is an enlarged partial view of a portion of the apparatus for adding powdered material to granular material illustrated in FIGURE 1.

The mulling of the granular material and powdered material mixture in the mixer 18 creates a considerable amount of hot moist air in, for example, foundry operations where granular material is foundry sand. The hot moist air tends to rise in the chute 20 along the outside of the chute, as indicated by the arrows 42. Granular material falling from the end of the continuous conveyer belt 44 into chute 20 proceeds downwardly centrally of the chute in a rather dense stream as indicated in FIGURE 3. The air currents are generally downward within the stream of granular material due to the falling of the granular material.

Bin 16 is connected into the chute 20 by means of an opening 46 in one side of the bin at the bottom and a horizontal extension 48 of the chute 20. The conveyor belt 44 which is an endless belt mounted for driving on the sprockets 50 by convenient means (not shown) forms a part of the floor of the bin 16 so that on driving of the conveyor belt 44 in a clockwise direction around the sprockets 50, granular material within the bin 16 is transferred into the chute 20 and subsequently into the mixer 18.

The structure 14 for feeding powdered mtaerial 30, such as bentonite, sea coal or wood flour, for use as a bonding material when the granular material is foundry sand includes the container 52, feeding structure 54 and the transfer structure 55. The powdered material is transferred to container 52 by convenient means through, for example, the conduit 56 extending into the container 52 tangentially, as shown best in FIGURE 2.

Container 52 is provided with a funnel-shaped divider 59 including crossed baffles 60 at the converging end thereof for breaking up swirling motion of the powdered material transferred to the container which is present due to the tangential entry of the powdered material into the container. The container 52 also includes the top 58 having opening 62 extending therethrough. Opening 62 in conjunction with cylinder 64 extending into the container 52 provides a vent for the pressure medium which may be used to transfer the powdered material into the container 52 while preventing the powdered material from escaping therefrom. Means such as motor 66 and blower 68 are provided to pressurize the container 52 for a purpose to be considered later.

The feeding apparatus 54 includes the motor 70 connected through the endless flexible linear member 72 to a gear box 74. The gear box is connected to a rotatable shaft 76 to provide rotation thereof on operation of the motor 70 which in turn will produce rotation of the table 78 connected to the shaft 76 for rotation therewith.

Figure 2:
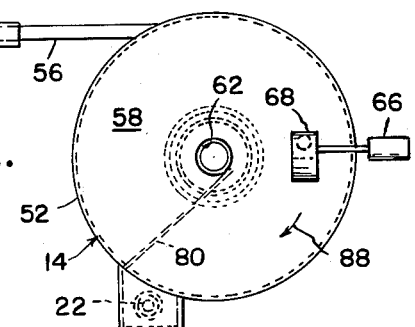
FIGURE 2 is a partial top view of the apparatus illustrated in FIGURE 1 taken in the direction of arrow 2 in FIGURE 1.

The transfer structure 55 includes a baffle 80, best shown in FIGURE 2, secured in container 52 against rotation. The transfer structure 55 further includes conduit 22 connected to the container 52 by means of the chute 82 having an open side communicating with the container 52, as shown best in FIGURE 2.

In operation of the structure 14 powdered material is passed into the container 52 through conduit 56 by convenient means, such as blowing with air. The powdered material enters the upper chamber 84 of container 52 with a swirling motion and falls through the baffles 60 which break up the swirling motion into the lower chamber 86 while the air used to convey the powdered material to the container 14 is exhausted through opening 62 in cover 58. The cylindrical member 64 aids in preventing the powdered material from being exhausted through the opening 62 along with the air.

The powdered material in chamber 86 of container 14 is transferred into chute 82 and subsequently into conduit 22 on rotation of table 78. Thus on rotation of table 78 due to actuation of the motor 70 through the drive chain of linear member 72, gear box 74 and shaft 76, the powdered material positioned on the table 78 is moved in a clockwise direction as indicated by arrow 88 in FIGURE 2 until it contacts baffle 80 at which time the powdered material is cammed radially outwardly so that it falls into chute 82.

In accordance with the invention the end 90 of chute 22 is positioned within the stream of downwardly falling granular material. Thus the powdered material from conduit 22 is fed into the stream of downwardly falling granular material rather than being fed into the upwardly moving moist air about the periphery of the chute 20.

Feeding of the powdered material into the stream of downwardly falling granular material has been found to eliminate objectionable dust previously produced on feeding of a powdered additive into granular material.

It is necessary to feed the powdered material 30 into the granular material 28 to prevent the upward currents of moist warm air about the periphery of chute 20 from carrying the powdered material upward as dust. Also it is found desirable to maintain a positive air pressure through conduit 22 even during periods when powdered material is not fed into the mixer 18 to prevent the warm moist air from proceeding up conduit 22 and chute 82 which would permit condensation thereof on the conduit 22 and chute and cause subsequent caking of the powdered material therein.

For this reason the blower 68 driven by motor 66 provides a substantially constant pressure to insure air flow through the tube 22 in the direction of arrow 92. The positive air pressure should not be great enough to drive the powdered material completely through the stream of granular material and out the other side thereof or the advantage of feeding the powdered material into the stream of granular material will be dissipated.

Figure 4:
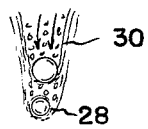
FIGURE 4 is a diagrammatic illustration of individual grains of granular material and powdered material mixed in the apparatus illustrated in FIGURE 1 in accordance with the method of the invention.

The exact reason why dust is eliminated on feeding the powdered material into the granular material is not known. It is, however, hypothesized that the individual grains of granular material 28, as shown greatly enlarged in FIGURE 4, due to friction with the air cause a generally downward current of air within the stream of granular material. Further it is believed that a vacuum condition exists at the upper side of the downwardly falling grains 28 and that the much smaller grains of powdered material are drawn into this vacuum and are thus carried downward into the mixer 18 in fine mixture with the granular material 28 rather than being permitted to float about on upward currents of air to produce dust in the chute 20 and mixer 18 which, since the chute and mixer are not of exceedingly tight construction in for example foundry operations, produce dust and dirt generally in the area of the mixing.

Figure 8:
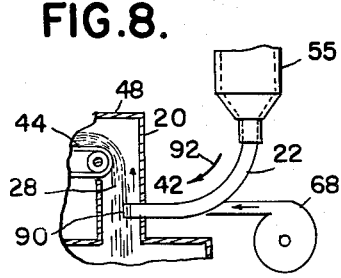
FIGURE 8 is a partially broken away elevation view of a modification of the apparatus illustrated in FIGURES 1—4.

As shown in FIGURE 8 the apparatus 10 may be modified by connecting the blower 68 into the conduit 22. Thus in the modified structure illustrated in FIGURE 8, wherein the same numerals have been used to indicate the same structural elements as in FIGURES 1-4, a positive pressure is always provided in the conduit 22 to prevent caking of the powdered material in the conduit 22 and in addition a vacuum is created in the container 52. Dust is thus further eliminated in the modified structure illustrated in FIGURE 8 since air flows into the container 52 through openings therein, such as between the container 52 and table 78 in contrast to the outward flow of air from the container 52 with the blower 68 connected into the container 52, as illustrated in FIGURES 1 and 2.

The modified apparatus 100 shown in FIGURE 5 for mixing powdered material with granular material comprises a batch type mixer 102, a weighing hopper 104 and transfer apparatus 106 for transferring powdered material from the weighing hopper 104 into the mixer 102.

The batch type mixer 102 includes the usual container 108, rollers 110 and scrapers 112 which are rotatable with the shaft 114 driven by convenient means (not shown) to mull granular material within the mixer 102. Such structure is conventional and will not be considered in further detail.

The hopper 104 for weighing powdered material to be added to granular material in the mixer 102 may be as disclosed in detail in commonly owned copending application Serial No. 259,069, filed February 18, 1963. As shown best in FIGURE 5 the weighing hopper 104 is supported on one end of balance beam 116 by pivotal mounting means 118. Hopper 104 is further provided with valve means 120 at the upper end thereof for permitting the introduction of powdered material into the hopper 104 and sealing the top of the hopper 104 as desired. Powdered material in hopper 104 is then exhausted therefrom on application of air pressure to manifold 122 through conduit 124 as set forth in the above referenced patent application.

Powdered material from the hopper 104 is thus transferred through conduit 126, slip coupling 128 and conduit 130. The powdered material is exhausted from the conduit 130 through the end 132 thereof immediately behind a scraper blade 112 as shown best in FIGURE 7. A positive pressure is maintained in conduit 130 by means of motor 138 and blower 136 in branch conduit 134.

The slip coupling 128 permits the conduit 130 and coupling 134 to rotate with the shaft 114 to which they are secured while the conduit 106 is mounted in a rigid fixed position. Conduit 130 is held securely in a predetermined position relative to the scraper blade 112 as it rotates by convenient means, such as the bracing member 136.

Thus the powdered material is positioned in a pocket 140 formed by the scraper 112 as the shaft 114 is rotated. As shown best in FIGURE 7 the pocket 140 is below the surface of the granular material so that the powdered material is again thoroughly mixed with the granular material before it can rise with warm air currents from the granular material and become objectionable dust.

The apparatus 150 illustrated in FIGURE 9 for mixing powdered material with granular material includes a batch mixer 152, batch hopper 154, storage bin 156, weighing hopper 158, apparatus 160 for transferring powdered material from the weighing hopper 158 into a stream of granular material 162 between the batch hopper 154 and mixer 152 and sequencing apparatus 164.

Mixer 152, batch hopper 154 and storage bin 146 are conventional. Thus storage bin 156 stores the granular material until it is desired to fill batch hopper 154, after which convenient means, such as the inflatable structure 166 associated with the lower end 168 of storage bin 156 is actuated to permit granular material to fill the batch hopper 154. At this time the jaws 170 of batch hopper 154 are closed by the actuating piston and cylinder construction 172. On opening of the jaws 170 by means of the actuating piston and cylinder 172, a charge of granular material 162 is permitted to flow into the container 174 of mixer 152 where it is mixed with additives on rotation of the rollers 176 and scrapers 178 which are rotated with shaft 180 by convenient means (not shown).

As previously considered in conjunction with the apparatus 100 in FIGURE 5, powdered material from the weighing hopper 158 is transferred through conduit 182 of the transfer apparatus 160 and is discharged into the stream of granular material 162 from batch hopper 154 on application of air pressure into manifold 184 through conduit 186 and valve 188. The action of the weighing hopper 158 is facilitated by means of the section of very flexible conduit 190 positioned between the relatively rigid conduit sections 182 and 192. Again a positive pressure is maintained in conduit 182 by means of the blower 194 in conjunction with motor 196.

The introduction of the powdered material into the falling stream of granular material is sequenced by means of the valve timing control circuit 198 in the synchronizing apparatus 164 in conjunction with the valves 200 in conduit 202 leading to the actuating cylinder and piston construction 172 of the batch hopper 154 and the valve 188 for applying air pressure to manifold 184 which has been considered above.

Thus in the usual operation where, for example, a batch hopper may have a charge of one thousand pounds of granular material, the batch hopper may be emptied in approximately three seconds after actuation of the cylinder 172. It is necessary therefore to provide the control circuit 198 to control the actuation of the valves 188 and 200 so that the powdered material from the weighing hopper 158 will be fed into the granular material 162 during the time, for example, the three seconds which it takes to unload the batch hopper 154. The circuit 198 which is not shown in detail since sequencing circuits are well known should sequence the valve 188 to open a short time after the opening of the valve 200 so that the powdered material is fed into the stream of granular material 162 as the stream of granular material passes the end 204 of the conduit 182. The valve 188 should be closed immediately prior to required time for discharging the granular material from the batch hopper 154 so that the powdered material is not fed from the end 204 of conduit 182 after granular material 162 has passed the end 204 of conduit 182. The time of opening of the valves 188 and 200 to accomplish this desired result and the air pressure necessary at the valves 200 and 188 may be determined by trial and error.

While one embodiment of the present invention has been disclosed in detail together with modifications thereof, it will be understood that other embodiments and modifications are contemplated. It is the intention to include all embodiments and modifications as are defined by the appended claims within the scope of the invention.

What we claim as our invention is:

1. A method of mixing powdered material with granular material comprising storing the granular material in a storage bin, measuring a predetermined quantity of the granular material from the storage bin into a batch hopper, weighing a predetermined amount of powdered material into a weighing hopper, discharging the predetermined quantity of granular material from the batch hopper into a granular material mixer, discharging the powdered material from the weighing hopper into the granular material from the batch hopper as it is discharged from the batch hopper into the mixer, and timing the discharge of the powdered material from the weighing hopper to start after the beginning of the discharge of the granular material from the batch hopper and to end before the end of the discharge of the granular material from the batch hopper.

2. Apparatus for mixing powdered material with granular material comprising a mill including rotatably mounted rollers and scrapers for mixing granular material and an additive fed into the mill, a storage bin for granular material positioned over the mill, an endless belt positioned below the storage bin for receiving granular material discharged therefrom on one end thereof, a chute extending between the other end of the endless belt and the mill into which the granular material is deposited from the other end of the endless belt and in which it falls by means of gravity into the mill, additive supply means including an additive storage chamber, means for blowing additive into the chamber, a conduit extending from adjacent the chamber to the center of the granular material falling through the chute, and means for delivering additive from the storage chamber into the conduit for exit from the end of the conduit within the chute substantially in the center of the granular material falling through said chute.

3. Structure as set forth in claim 2 and further including a blower, and means connecting the blower into the conduit for blowing the additive into the stream of granular material under pressure.

References Cited by the Examiner

UNITED STATES PATENTS

| | | | |
|---|---|---|---|
| 845,438 | 2/1907 | Shephard | 259—24 |
| 1,752,549 | 4/1930 | Beardsley et al. | 22—35 |
| 2,487,139 | 11/1949 | Jackson et al. | 22—217 |
| 2,593,327 | 4/1952 | McIlvaine | 22—89 |
| 2,902,681 | 9/1959 | Dietert et al. | 22—89 |
| 2,925,636 | 2/1960 | Darby | 22—79 |
| 3,088,713 | 5/1963 | Gard | 259—18 |
| 3,161,485 | 12/1964 | Buhrer | 22—89 |

J. SPENCER OVERHOLSER, *Primary Examiner.*

R. D. BALDWIN, *Assistant Examiner.*